Patented Oct. 31, 1944

2,361,624

UNITED STATES PATENT OFFICE 2,361,624

STABILIZED THERAPEUTIC AGENTS

William F. Hamilton, Altadena, and Melvin F. George, Jr., and Eli Simon, Los Angeles, Calif., assignors to Frederick M. Turnbull, Los Angeles, Calif.

No Drawing. Application September 20, 1941, Serial No. 411,718

16 Claims. (Cl. 167—65)

This invention relates to the stabilization of derivatives of p-amino benzene sulfonic acid or sulfanilic acid, $NH_2 \cdot C_6H_4 \cdot SO_2OH$, including sulfanilamide, sulfapyridine, sulfaguanidine, sulfathiazole, and sulfadiazine. By way of example, the application of our invention, and its objects and advantages are described in connection with sulfathiazole and sulfadiazine, it being understood that our invention is not limited to such application.

The sodium salt of sulfathiazole (sodium 2-sulfanilyl aminothiazole) has been found to be a very effective therapeutic agent in the treatment of chronic sinusitis and like conditions, particularly when employed in an aqueous solution, typically a 2.5 or 5% solution. However, such a solution is not stable to air or sunlight and is subject to changes in color within a few hours after its preparation without exposure to sunlight and within a few minutes when exposed to sunlight, necessitating the preparation of fresh solution each time that it is used.

It is an object of the present invention to provide a stabilizer for a basic salt of an amide-substituted derivative of p-amino benzene sulfonic acid, e. g., sodium sulfathiazole such that aqueous solutions or other solutions may be prepared and kept for long periods of time without deterioration.

It is a further object of the present invention to provide a stabilizer of the kind described which exerts no harmful physiological effect.

A further object of the present invention is to provide a means to stabilize an aqueous solution of a basic salt of an amide-substituted derivative of p-amino benzene sulfonic acid, e. g., sodium sulfathiazole to the degree that it may be manufactured and distributed through the normal channels of commerce and ultimately used by the patient without any substantial formation of products of deterioration which would lessen the efficacy of otherwise harmfully affect such a solution from the standpoint of its intended therapeutic use, and it is such stabilization that we mean when we employ the term "stabilized solution" or refer to the stabilizing agent as "providing stability" of the derivative of p-amino benzene sulfonic acid.

In accordance with the present invention, the above and other objects are attained by the use of normal or alkaline sulphite ions, preferably introduced by using sodium sulphite, as a protecting agent.

If a vaso-constrictor is added to the solution of sodium sulfathiazole, the relief provided is more rapid. Accordingly, it is an object of our invention to provide a stable solution of sodium sulfathiazole containing a vaso-constrictor, such as neo-synephrin hydrochloride, having the property of shrinking congested membranes and driving the blood therefrom.

For many applications a solution of sodium sulfathiazole in jelly or semi-solid form has advantages over such a solution in very fluid form, and it is a corresponding object of our invention to provide such a stabilized solution in jelly form which is viscous or semi-solid at about body temperature.

Other objects and features of the invention will become apparent from the following detailed description.

An aqueous solution, such as a 5% solution of sodium 2-sulfanilyl aminothiazole, is an extremely beneficial specific for germs of the type affecting the sinuses, eyes, and ears, typically the staphylococcus and pneumococcus groups and also streptococci. It is also of value in treating ear discharges which may contain germs of the diphtheroid or gonococcus groups and has frequently been of value in alleviating actue and chronic conditions of conjunctivitis. One of its most important uses, however, is in the treatment of acute and chronic sinusitis, in which it is used in the form of a nasal spray or drops, or jelly, or by instillation directly into the sinuses. Its use has brought about marked improvement in the treatment of cases of long-standing staphylococcic and streptococcic infections which were extremely resistant to control by other therapeutic agents such as the sulfanilamide compounds. Such a solution is effective for middle ear and mastoid infections when placed in the middle ear and acts upon infections of the cocci types when applied as eye drops. Further, a solution of such concentration is most effective applied externally in the treatment of impetigo and other skin infections.

Heretofore the marked instability of aqueous solutions of sodium sulfathiazole against the action of air and/or light has made it necessary to prepare the solution immediately before its use, since even in a few hours deterioration sets in with the formation of yellow color. We have found as a result of our researches that this deterioration is due to oxidation and/or hydrolysis of the sodium sulfathiazole apparently according to the following reactions.

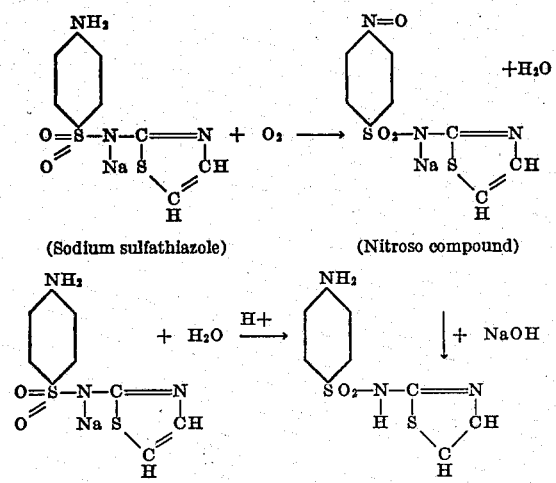

If the pH of the solution is less than about 8.2, the sulfathiazole itself, which is relatively insoluble, is precipitated from solution.

We have established that alkaline sulphite ion is an effective inhibitor for such reactions, apparently by virtue of preferentially reacting with the oxygen to form sulphate ion and also buffering the solution. We do not wish to be bound by any theory in this respect because there may be other specific effects of inhibition which are not associated with the conversion of sulphites to sulphates in alkaline solutions.

We prefer to employ alkali metal sulphites, typically sodium sulphite, as a source of normal or alkaline sulphite ion. A particularly advantageous feature of the alkali metal sulphites is that they yield a buffer pH value in the region of approximately 8.3 to 10, which is completely compatible with the sodium sulfathiazole which in 5% concentration has a pH value of about 10. Thus, for example, when a 5% sodium sulfathiazole solution which has a pH value of about 10 is stabilized by the incorporation of about 2% of sodium sulphite, which in 2% concentration by itself has a pH value of approximately 9.5, a final solution having a pH value in the neighborhood of 10 is obtained. This feature is of substantial importance, since, if the pH of the stabilizing agent is much lower than the pH of the sodium sulfathiazole to be stabilized, the sodium salt is decomposed and a precipitate is formed in the solution. If, on the other hand, the pH of the stabilizing agent is too high, for example above 11, the final solution is so caustic as to make its use for physiological purposes inadvisable.

In a preferred form of our invention we incorporate in the stabilized aqueous solution a small quantity of an oxidation inhibitor for the sulphite. For example, we may add as little as .01% of mono- or poly-hydric alcohols and/or certain aromatic aldehydes, such as glycerine, isopropyl alcohol, benzyl alcohol, benzaldehyde, and normal or secondary butyl alcohols. These chemicals form a mutually protective system with the sulphite which serves to substantially increase the effective life of the sulphite ion in its role as a protective agent for the sodium sulfa- thiazole. An additional amount of glycerine up to 10% is added to reduce surface tension, to increase the wetting of the surfaces which it is desired to treat by the therapeutic solution, to prevent unduly rapid evaporation, and to act as a tissue softener.

Optionally there may be employed phenolphthalein or other coloring agent to give the solution a pleasing color and minute amounts of spearmint, wintergreen, and peppermint oils with a carrier of vanilla to provide a pleasing odor. They may be added, if desired, with a minute amount of benzaldehyde, the benzaldehyde acting as an additional stabilizer for the sodium sulphite and contributing a pleasing odor to the solution.

Our invention may be further illustrated by reference to the following compositions, which provide stabilized solutions of sodium sulfathiazole which are stable even under fairly rigorous conditions of exposure for periods long enough to permit manufacture, distribution, shelf storage, and eventual utilization by the patient without substantial appearance of discoloration or loss in efficacy.

|  | Example #1 | Example #2 |
|---|---|---|
|  | Parts | Parts |
| Sodium sulfathiazole | 5 | 2.5 |
| Sodium sulphite | 2 | 2 |
| Glycerine | 5 | 3 |
| Water | 87.5 | 91.8 |
| Coloring and flavoring ingredients in ethanol solution | .5 | .5 |
| Neo-synephrin hydrochloride |  | .2 |

While sodium sulfathiazole solutions are normally used at about 5% concentration, the present invention is applicable to solutions of any concentration within the solubility limits of the thiazole. We have found the 2.5% solution of Example #2 extremely efficacious; an aqueous solution of 2.5% sodium sulfathiazole, as set forth in Example #2, has a pH of about 8.6, permitting its application to the eyes without danger of alkaline irritation.

It is impossible to state precise limits for the concentration of the sodium sulphite, since this will vary according to the amount of sodium sulfathiazole employed, the severity of the oxidizing conditions to which the thiazole is subjected, and the length of time during which it is anticipated protection will be needed. As indicated, about 2% of sodium sulphite on the basis of the finished solution affords adequate protection for 5% solution of sodium sulfathiazole under most conditions. However, the quantity of sulphite may be substantially reduced where the intended period of protection is short and where the oxidizing conditions are relatively mild, and, on the other hand, the concentration of sodium sulphite increased up to saturation value may be employed if desired.

The pH of the solution is preferably maintained above 8.2, since at lower pH values there is a precipitation of insoluble material due to metathesis of the sodium salts. On the other hand, the pH should not be allowed to rise to values above about 9 when used in the eyes or above about 11 when used on other parts of the body in view of possible injury to the tissues.

The present invention also extends to admixtures of sodium sulphite and sodium sulfathiazole in other than aqueous media; for example, the salts may be admixed dry in suitable proportions and formed into pellets of such size as to give the desired solution when admixed with the specified quantity of specially purified water.

It is extremely desirable to incorporate in the solution of stabilized sodium sulfathiazole a vaso-constrictor, i. e., an agent having the property of shrinking congested membranes to which it is applied by driving the blood therefrom. Ephedrine, ephedrine salts, or neo-synephrin hydrochloride ($C_9H_{13}O_2N \cdot HCl$) are of particular advantage for this purpose. We have found that we can combine neo-synephrin hydrochloride in the stabilized solution, hereinbefore described, to the maximum extent desired for medicinal purposes. Thus, a .2% concentration of neo-synephrin hydrochloride, which for many uses of the therapeutic solution appears to be of the optimum concentration, is compatible with the stabilized solution, the resulting solution having a pH of approximately 8.7. The resulting solution has a pH value somewhat diminished by the neo-synephrin hydrochloride, thus diminishing the danger of caustic or alkaline irritation of the tissue to which it is applied. The resulting solution also has slightly less stability because of the addition of the hydrogen ion from the neo-synephrin hydrochloride, but this effect can be somewhat reduced by adding a greater amount of sodium sulphite. If the neo-synephrin hydrochloride is added to the sodium sulfathiazole without any sodium sulphite therein, the sulfathiazole may precipitate immediately and apparently completely. However, if the sodium sulphite is first added to the solution and the neo-synephrin hydrochloride is thereafter added thereto, it readily dissolves therein and forms a stable solution.

We have found also that it is possible to stabilize an aqueous solution of sodium sulfathiazole containing ephedrine, which is a more powerful vaso-constrictor than neo-synephrin. Thus, if there is added to an aqueous solution of about 5% sodium sulfathiazole about 1 to 3% of sodium sulphite, about 1 to 2% of sodium phosphate, about .1 to .3% of neo-synephrin, about 1 to 10% of glycerine, and about .001 to .01% of ephedrine, the ephedrine readily enters into solution, and the entire solution becomes stable to light and air over a sufficient length of time to make thoroughly practical its manufacture, shipment for storage, and storage by the purchaser for use without precipitation or discoloration or diminution in the effectiveness of the solution.

We have found particularly efficacious and stable a water solution of about 5% sodium sulfathiazole containing about 2% sodium sulphite, about 1% sodium phosphate, about .2% neo-synephrin hydrochloride; about 5% glycerine, and about .01% ephedrine.

To the stabilized solution containing neo-synephrin hydrochloride and to the stabilized solution containing both neo-synephrin hydrochloride and ephedrine there may be added a coloring agent, such as a minute amount of phenolphthalein, and minute amounts, such as a fraction of 1%, of spearmint, wintergreen, peppermint, and/or vanilla oils with or without benzaldehyde in ethanol solution.

We prefer to form the stabilized solution of sodium sulfathiazole by first adding to cool water, which has been freshly distilled, the necessary amount of glycerine and then mixing the solution thoroughly and adding the chemically pure anhydrous sodium sulphite in an amount to provide the desired concentration thereof. The mixture is agitated until all of the sodium sulphite is dissolved. Thereafter all of the remaining ingredients, except the sodium sulfathiazole, may be added in any order or simultaneously. After such ingredients are completely dissolved, the sodium sulfathiazole is added as the last ingredient. If no coloring ingredient has been added, it may be observed that upon the addition of sodium sulfathiazole the color of the solution may change from water white to yellow, reaching maximum intensity in about five minutes. However, should this occur, the color later fades, and within about one hour the solution becomes substantially water white again, and upon reaching this condition the solution remains stable.

The solution is preferably then filtered through a fine filter, such as a No. 4 or No. 5 porosity fritted glass filter, to remove any dust, lint, or other foreign matter therein which might diminish the stabilizing effect of the stabilizing agents. The solution is then ready for storage or use. It is preferably placed in colored bottles, such as amber or brown bottles, to protect it from the action of light, such bottles being stoppered, preferably, with caps of a synthetic resin.

Instead of supplying the stabilized solution of sodium sulfathiazole in very fluid form, this solution may be provided in the form of a jelly suitable for application as a viscous liquid or in a semi-solid state.

The solution may be prepared as hereinbefore described, so that it contains about 2.5 or 5% sodium sulfathiazole, about 2% sodium sulphite, about 3 or 5% glycerine, and, if desired, about .01% of coloring or flavoring ingredients both in ethanol solution with or without .2% neo-synephrin hydrochloride. This solution is made gelatinous by incorporating methyl cellulose, the methyl cellulose being stable within a pH range from 2 to 12. It is commercially available in solid form and is added to boiling water, and the mixture is cooled to room temperature with or without agitation, so that the solid is thoroughly wetted. When this mixture has reached room temperature, the stabilized sodium sulfathiazole solution cooled to about the temperature of melting ice is added, and the resulting mixture, with water at about the temperature of melting ice added to final volume, is agitated and maintained at a reduced temperature, preferably around the temperature of melting ice, until a clear solution is obtained, frequent agitation being desirable. The methyl cellulose having the property of becoming hydrated or entering into a colloidal solution at a reduced temperature far more readily than at an elevated temperature, the mixture forms a gelatinous mass with the stabilized sodium sulfathiazole distributed uniformly through it.

The viscosity of the mass is determined by the nature of the methyl cellulose. If the methyl cellulose be that known commercially as XX High Vis and be employed in about 3% concentration, the resulting gelatinous mass is semi-fluid or of the nature of No. 1 cup grease at body temperature. Other low viscosity grades of methyl cellulose may be employed to obtain comparable viscosity of the mass if the concentration of such other grades be increased. Instead of methyl cellulose, agents of the gum type, such as gum tragacanth, may be employed.

Preferably the jelly thus formed contains a preservative, such as .1% of sodium benzoate.

The sodium sulphite stabilized solution of sodium sulfathiazole in such gelatinous form has a stability comparable with the water solution employed in its compounding, and, as will be readily understood by those skilled in the art, offers certain advantages in its application over the water solution, previously described.

As another example of the derivatives of p-amino benzene sulfonic acid, we have employed sodium sulfadiazine instead of sodium sulfathiazole in the same range of concentrations in the solutions hereinbefore described, such sulfadiazine solutions having high therapeutic value and stability comparable to the stability of the sulfathiazole solutions.

While those agents in their concentrations and the method of compounding them previously described are fully capable of performing the objects and providing the advantages primarily stated, it will be understood that sulfathiazole has, in such description, been employed only as an example of the derivatives of p-amino benzene sulfonic acid, and it will be further understood by those skilled in the art that various modifications or alterations may be made therein, and we wish our invention to be understood, therefore, as not restricted to the specific examples hereinbefore set forth, but as entitled to the full scope of the claims which follow.

Compositions including a vaso-constrictor are claimed in our copending application 445,514 filed June 2, 1942.

We claim as our invention:

1. A stabilized solution of a metallic salt of an amide substituted derivative of p-amino benzene sulfonic acid containing normal sulphite ions as a stabilizer.

2. A stabilized solution of an alkali metal salt of an amide substituted derivative of p-amino benzene sulfonic acid containing a normal alkali metal sulphite as a stabilizer.

3. A stabilized solution of an alkali metal salt of an amide substituted derivative of p-amino benzene sulfonic acid containing a normal alkali metal sulphite as a stabilizer, and containing a sulphite oxidation inhibitor.

4. A stabilized solution of sodium sulfathiazole containing normal sulphite ions as a stabilizer.

5. A stabilized solution of sodium sulfathiazole containing a normal alkali metal sulphite as a stabilizer.

6. A stabilized solution of sodium sulfathiazole containing a normal alkali metal sulphite as a stabilizer, and containing a sulphite oxidation inhibitor.

7. A solution of sodium sulfathiazole in concentration of therapeutic value containing sodium sulphite in concentration providing stability of the sodium sulfathiazole and containing one of that group of sulphite oxidation inhibitors consisting of monohydric alcohols, polyhydric alcohols, and aromatic aldehydes in concentration providing stability of the sodium sulphite.

8. A solution as defined in claim 7, in which said sulphite oxidation inhibitor is glycerine, and in which the glycerine is present in concentration in excess of that providing stability of the sodium sulphite.

9. A stabilized solution of sodium sulfadiazine containing normal sulphite ions as a stabilizer.

10. A stabilized solution of sodium sulfadiazine containing a normal alkali metal sulphite as a stabilizer.

11. A stabilized solution of sodium sulfadiazine containing a normal alkali metal sulphite as a stabilizer, and containing a sulphite oxidation inhibitor.

12. A stabilized solution of sodium sulfanilamide containing normal sulphite ions as a stabilizer.

13. A stabilized solution of sodium sulfanilamide containing a normal alkali metal sulphite as a stabilizer.

14. A stabilized solution of sodium sulfanilamide containing a normal alkali metal sulphite as a stabilizer, and containing a sulphite oxidation inhibitor.

15. A stabilized therapeutic gelatinous solution comprising a basic salt of an amide substituted derivative of p-amino benzene sulfonic acid, a sufficient amount of normal sulphite ions to stabilize said basic salt of said derivative, and methyl cellulose as a gelatinizing agent.

16. A stabilized therapeutic solution for local external application containing a basic salt of an amide-substituted derivative of p-amino benzene sulfonic acid in concentration up to approximately 5% and containing normal sulphite ions as a stabilizer.

WILLIAM F. HAMILTON.
MELVIN F. GEORGE, Jr.
ELI SIMON.

CERTIFICATE OF CORRECTION.

Patent No. 2,361,624.   October 31, 1944.

WILLIAM F. HAMILTON, ET AL.

It is hereby certified that error appears in the printed specification of the above numbered patent requiring correction as follows: Page 1, first column, line 42, for the word "of" before "otherwise" read --or--; and second column, line 30, for "actue" read --acute--; and that the said Letters Patent should be read with this correction therein that the same may conform to the record of the case in the Patent Office.

Signed and sealed this 16th day of January, A. D. 1945.

Leslie Frazer (Seal)   Acting Commissioner of Patents.